US009706378B2

United States Patent
Mahendran

(10) Patent No.: US 9,706,378 B2
(45) Date of Patent: Jul. 11, 2017

(54) SYSTEM, APPARATUS AND METHOD TO ENABLE MOBILE STATIONS TO IDENTIFY CALLS BASED ON PREDETERMINED VALUES SET IN A CALL HEADER

(71) Applicant: QUALCOMM Incorporated, San Diego, CA (US)

(72) Inventor: Arungundram Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/867,783

(22) Filed: Sep. 28, 2015

(65) Prior Publication Data

US 2016/0021523 A1 Jan. 21, 2016

Related U.S. Application Data

(62) Division of application No. 12/433,402, filed on Apr. 30, 2009, now Pat. No. 9,148,769.

(Continued)

(51) Int. Cl.
*H04M 11/04* (2006.01)
*H04W 4/22* (2009.01)
(Continued)

(52) U.S. Cl.
CPC ......... *H04W 4/22* (2013.01); *H04L 29/12594* (2013.01); *H04L 61/3085* (2013.01);
(Continued)

(58) Field of Classification Search
CPC . H04W 76/007; H04W 4/16; H04M 1/72519; H04M 11/00
(Continued)

(56) References Cited

U.S. PATENT DOCUMENTS 5,712,900 A  1/1998  Maupin et al.
6,208,718 B1  3/2001  Rosenthal
(Continued)

FOREIGN PATENT DOCUMENTS

CN  1505908 A  6/2004
CN  101031135 A  9/2007
(Continued)

OTHER PUBLICATIONS

3GPP—3rd Generation Partnership Project. Technical Specification Group Core Network and Terminals; Numbering, addressing and identification (Release 8). TS 23:003, V8.0,0 (Mar. 2008), 53 Pages.
(Continued)

*Primary Examiner* — Danh Le
(74) *Attorney, Agent, or Firm* — Fariba Yadegar-Bandari; Guy Perry

(57) ABSTRACT

A mobile device/UE identifies calls to or callbacks from a Public Safety Access Point (PSAP) to provide priority handling. When the UE does not detect that the call being made is an emergency call, then the network facilitates identification during call establishment of the emergency nature. The network identifies the call as emergency call in a SIP response by setting the Priority header to a distinctive value (e.g., "emergency-call") or the "P-Asserted-Identity" to a distinctive value (e.g., "urn:services:sos"). When the PSAP chooses to call back the mobile/UE, the mobile/UE can terminate any ongoing calls and accept this call from the PSAP and can disable other supplementary services (e.g., call waiting, three-way calling, etc.) during the call. A P-Asserted-Identity of the incoming call is set to a distinctive location associated with the PSAP (e.g., "urn:services: sos"). Alternatively, the incoming call has a Priority header set to a distinctive value (e.g., "emergency", "emergency-callback").

20 Claims, 9 Drawing Sheets

Related U.S. Application Data

(60) Provisional application No. 61/051,304, filed on May 7, 2008, provisional application No. 61/080,188, filed on Jul. 11, 2008.

(51) Int. Cl.
*H04L 29/12* (2006.01)
*H04W 76/00* (2009.01)
*H04L 29/06* (2006.01)
*H04W 88/02* (2009.01)
*H04W 88/08* (2009.01)

(52) U.S. Cl.
CPC ...... *H04L 65/1006* (2013.01); *H04L 65/1096* (2013.01); *H04W 76/007* (2013.01); *H04W 88/02* (2013.01); *H04W 88/08* (2013.01)

(58) Field of Classification Search
USPC ............. 455/404.1, 550.1, 445; 379/37
See application file for complete search history.

(56) References Cited

U.S. PATENT DOCUMENTS

| | | | |
|---|---|---|---|
| 6,393,268 | B1 | 5/2002 | Biedermann |
| 6,571,092 | B2 | 5/2003 | Faccin et al. |
| 6,775,534 | B2 | 8/2004 | Lindgren et al. |
| 6,922,565 | B2 | 7/2005 | Rhodes et al. |
| 7,050,785 | B2 | 5/2006 | Islam et al. |
| 7,340,241 | B2 | 3/2008 | Rhodes et al. |
| 7,508,840 | B2 | 3/2009 | Delaney |
| 7,929,530 | B2 * | 4/2011 | Marshall ............... H04L 12/66 370/389 |
| 9,148,769 | B2 | 9/2015 | Mahendran |
| 2004/0036175 | A1 | 2/2004 | Aoyama et al. |
| 2004/0203565 | A1 | 10/2004 | Chin et al. |
| 2005/0124316 | A1 | 6/2005 | Islam et al. |
| 2005/0233726 | A1* | 10/2005 | Katsube ............. H04W 76/007 455/404.1 |
| 2006/0058004 | A1* | 3/2006 | Dolezal ................. G08B 21/10 455/404.1 |
| 2006/0250962 | A1 | 11/2006 | Chikamatsu |
| 2007/0155399 | A1 | 7/2007 | Alberth et al. |
| 2007/0160056 | A1 | 7/2007 | Matsumoto et al. |
| 2007/0190968 | A1 | 8/2007 | Dickinson et al. |
| 2007/0211867 | A1 | 9/2007 | Polk et al. |
| 2008/0016556 | A1 | 1/2008 | Selignan |
| 2008/0101224 | A1* | 5/2008 | Khasnabish ....... H04L 43/0817 370/230 |
| 2008/0310599 | A1* | 12/2008 | Purnadi ............... H04M 3/5116 379/37 |
| 2009/0004997 | A1 | 1/2009 | Allen et al. |
| 2009/0005044 | A1 | 1/2009 | Payyappilly et al. |
| 2009/0047924 | A1 | 2/2009 | Ray et al. |
| 2009/0054029 | A1* | 2/2009 | Hogberg ............. H04L 41/5006 455/404.2 |
| 2009/0055899 | A1 | 2/2009 | Deshpande et al. |
| 2009/0296689 | A1* | 12/2009 | Bakker .................. H04L 65/40 370/352 |
| 2009/0298458 | A1* | 12/2009 | Bakker ............. H04M 3/42348 455/404.1 |
| 2009/0316683 | A1 | 12/2009 | Gass et al. |
| 2010/0014508 | A1 | 1/2010 | Yang |

FOREIGN PATENT DOCUMENTS

| | | |
|---|---|---|
| CN | 101110991 A | 1/2008 |
| CN | 101132378 A | 2/2008 |
| EP | 2056556 A1 | 5/2009 |
| JP | 1132377 A | 2/1999 |
| JP | 1198554 A | 4/1999 |
| JP | 11234730 A | 8/1999 |
| JP | H11331314 A | 11/1999 |
| JP | 2004140838 A | 5/2004 |
| JP | 2004535645 A | 11/2004 |
| JP | 2006005880 A | 1/2006 |
| JP | 2007184798 A | 7/2007 |
| JP | 2011523266 | 8/2011 |
| RU | 2193287 C2 | 11/2002 |
| RU | 2259642 C2 | 8/2005 |
| WO | 9811742 A2 | 3/1998 |
| WO | 03009627 A1 | 1/2003 |
| WO | 2008006055 A2 | 1/2008 |
| WO | 2008151406 A1 | 12/2008 |
| WO | 2009137617 A1 | 11/2009 |
| WO | 2010004202 A1 | 1/2010 |

OTHER PUBLICATIONS

3GPP—3rd Generation Partnership Project Technical Specification Group Services and System Aspects; IP Multimedia Subsystem (IMS) emergency sessions (Release 7). TS 23.167, V7.8.0 (Mar. 2008), 32 pages.

El Barachi, et al., "Enhancing the QoS and Resource Management Aspects of the 3GPP IMS Emergency Service Architecture", 5th IEEE Consumer Communications and Networking Conference, Jan. 10-12, 2008, pp. 112-116.

Ericsson: "Indicator for Emergency Callback" 36PP Draft; S2-082845, 3rd Generation Partnership Project (3GPP), Mobile Competence Centre ; 650, Route Des Lucioles ; F-06921 Sophia-Antipolis Cedex; France,vol. SA WG2, No. Jeju; Apr. 7, 2008, Apr. 10, 2008 (Apr. 10, 2008), XP050265102 the whole document.

H. Schulzrinne: "Marking of Calls initiated by Public Safety Answering Points (PSAPs)"Internet-Draft (IETF) Mar. 3, 2009 (Mar. 3, 2009), pp. 1-15,; XP02541934 Retrieved from the Internet: URL:http://tools.ietf.org/html/draft-schulzrinne-ecrit-psap-call-back-00> [retrieved on Aug. 19, 2009] the whole document.

International Search Report and Written Opinion—PCT/US2009/043035, International Search Authority—European Patent Office—Aug. 31, 2009.

James P., "IANA Registering a SIP Resource Priority Header Namespace for Local Emergency Communications draft-polk-ecrit-local-emergency-rph-namesspace-02", Internet-Draft (IETF), Cisco Systems, Nov. 17, 2007, pp. 1-8. (http://tools.ietf.org/html/draft-polk-ecrit-local-emergencyrph-namespace-02. txt ) Paragraph 2 of Chapter 3 and Paragraph 2 of Chapter 2 of p. 5.

Patel, M.: "SOS Uniform Resource Identifier (URI) parameter for marking of Session Initiation Protocol (SIP) requests related to emergency services," Internet-Draft (IETF), Sep. 12, 2008, pp. 1-9, XP002541935, Retrieved from the Internet: URL:http://tools.ietf.org/html/draft-patel-ecrit-sos-parameter-00> [retrieved on Aug. 19, 2009] the whole document.

Rosen et al., "Best Current Practice for Communications Services in support of Emergency Calling draft-ietf-ecrit-phonebcp-03", Internet-Draft (IETF), Cisco Systems, Nov. 19, 2007, pp. 1-40. (http://tools.ietf.org/html/draft-ietf-ecrit-phonebcp-03) ED-4/SP-3 of p. 3 ED-76 of p. 17 No. 5 of SP-35 of p. 34.

Rosen, et al.,"Best Current Practice for Communications Services in support of Emergency Calling", Internet-Draft (IETF), Feb. 28, 2005, XP002541933, pp. 1-43.

Taiwan Search Report—TW098115155—TIPO—Jul. 10, 2012.

* cited by examiner

SYSTEM, APPARATUS AND METHOD TO ENABLE MOBILE STATIONS TO IDENTIFY CALLS BASED ON PREDETERMINED VALUES SET IN A CALL HEADER

CROSS-REFERENCE TO RELATED APPLICATIONS

The present application for patent is a divisional under 35 U.S.C. §121 based on U.S. patent application Ser. No. 12/433,402, entitled "SYSTEM, APPARATUS AND METHOD TO ENABLE MOBILE STATIONS TO IDENTIFY CALLS BASED ON PREDETERMINED VALUES SET IN A CALL HEADER," filed Apr. 30, 2009, which claims priority under 35 U.S.C. §119 to Provisional Application No. 61/051,304, entitled "SYSTEM, APPARATUS AND METHOD TO ENABLE MOBILE STATIONS TO IDENTIFY CALLS BASED ON PREDETERMINED VALUES SET IN A CALL HEADER," filed May 7, 2008 and to Provisional Application No. 61/080,188, entitled "SYSTEM, APPARATUS AND METHOD TO ENABLE MOBILE STATIONS TO IDENTIFY CALLS BASED ON PREDETERMINED VALUES SET IN A CALL HEADER," filed Jul. 11, 2008, each of which are assigned to the assignee hereof and hereby expressly incorporated by reference herein in their entirety.

FIELD OF INVENTION

The exemplary and non-limiting aspects described herein relate generally to wireless communications systems, methods, computer program products and devices, and more specifically to techniques that enable mobile stations or user equipment (UE) to identify calls based on predetermined values set in a call header.

BACKGROUND

A Public Safety Answering Point (PSAP) is a call center responsible for answering calls to an emergency telephone number for police, firefighting, and ambulance services. These facilities are also referred to as a Public Service Access Point (PSAP). Trained telephone operators are also usually responsible for dispatching these emergency services. Most PSAPs are now capable of caller location for landline calls, and many can handle mobile phone locations as well, where the mobile phone company has a handset location system. Emergency call services, often referred to as "9-1-1" calls, are automatically routed to an appropriate PSAP for a geographic origin of the emergency call. The PSAP benefits from being able to identify the Public Switched Telephone Network (PSTN) origin of the call in order to perform location determinations and making a call back should the call be interrupted.

Recent developments in mobile communications have posed challenges to offering emergency call services by PSAPs, which has been addressed by providing various ways to determine a location of user equipment (UE). In addition, accommodations have been made to receive and send Session Initiated Protocol (SIP) packetized IP calls. Extensive developments on the network side have sought to create a universal solution at least by region or locale to serve all users and to readily inform first responders.

However, the population of mobile devices or user equipment (UE) varies greatly by service provider and device type. Although most users are familiar with how to make a 9-1-1 call, challenges exist when initiating a call from UE that is not detected as an emergency call or when receiving an emergency callback. In the former case, the UE may not give appropriate priority handling for the communication warranted in an emergency situation. In the latter case, the UE again does not recognize that the callback is an emergency call warranting priority handling even though the UE did recognize the outgoing call as a priority.

Consider when under the stressful circumstances of an emergency that a user of UE experiences a session interruption when trying to contact a PSAP. The PSAP can initiate an emergency callback, although the user could in the meantime have tried to make another call seeking assistance. The current session can prevent or obscure the priority nature of the emergency callback. Alternatively or in addition, a third party alerts a PSAP that a user of a UE is or could be in an emergency situation and the PSAP chooses to initiate an emergency "callback" when a user does not expect to receive such a call. For example, a hazardous situation can arise requiring evacuation. The UE and the user of the UE can easily treat such a call as routine, missing time critical communications as well as tying up scarce emergency resources trying to contact such a user.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and the corresponding disclosure thereof, various aspects are described in connection with handling of emergency calls at user equipment (UE) (e.g., user terminal, access terminal, portable communication device, etc.) such that a user is alerted and any constraining data or call sessions are not allowed to prevent establishment of an emergency call session. Priority handling is facilitated in instances in which the UE initiates a call without detecting that it is an emergency call, when a PSAP call-back occurs subsequent to a dropped detected emergency call, or when the PSAP initiates a call to the UE.

In one aspect, a method is provided for performing priority handling of an emergency call using user equipment communicating with a Public Safety Access Point (PSAP) that employs a processor executing computer executable instructions stored on a computer readable storage medium to implement the following acts: Data packet communication is received at user equipment originating from a PSAP. A header is detected for the data packet communication identified as an emergency call. Priority handling of the emergency call is performed.

In another aspect, a computer program product is provided for performing priority handling of an emergency call using user equipment communicating with a Public Safety Access Point (PSAP). A processor is operatively coupled to a computer readable medium having stored thereon the following computer executable components: A set of codes causes a computer to receive at user equipment a data packet communication originating from a PSAP. A set of codes causes the computer to detect a header for the data packet communication identifying an emergency call. A set of codes causes the computer to perform priority handling of the emergency call.

In an additional aspect, an apparatus is provided for performing priority handling of an emergency call using user equipment communicating with a Public Safety Access Point (PSAP). At least one computer readable storage medium stores computer executable instructions that when executed by at least one processor implement components comprising: Means are provided for establishing at user equipment a data packet communication with a PSAP. Means are provided for identifying the data packet communication as an emergency call. Means are provided for performing priority handling of the emergency call.

In a further aspect, an apparatus is provided for performing priority handling of an emergency call using user equipment communicating with a Public Safety Access Point (PSAP). A transmitter is for transmitting to a network. A receiver is for receiving from a network. A computing platform is for establishing at user equipment a data packet communication with a PSAP via the transmitter and receiver, for identifying the data packet communication as an emergency call, and for performing priority handling of the emergency call.

In another additional aspect, a method is provided for user equipment (UE) undetected emergency call originations by employing a processor executing computer executable instructions stored on a computer readable storage medium to implement the following acts: A user equipment (UE) originates an undetected emergency call and detects a header in the response identifying the call as an emergency call and then performs priority handling of the emergency call.

In yet another additional aspect, an apparatus is provided for user equipment (UE) undetected emergency call originations, comprising at least one computer readable storage medium storing computer executable instructions that when executed by at least one processor implement components. Means are provided for originating a user equipment (UE) undetected emergency call. Means are provided for detecting from a header in the response identifying the call as an emergency call. Means are provided for performing priority handling of the emergency call.

In yet a further aspect, an apparatus is provided for user equipment (UE) undetected emergency call originations. A receiver is for receiving data packet communication from a network. A transmitter is for originating a user equipment (UE) undetected emergency call. A computing platform is for detecting from a header in the response received by the receiver identifying the call as an emergency call and for performing priority handling of the emergency call.

In yet one aspect, a method is provided for a network to facilitate performing priority handling of an emergency call by user equipment establishing communication with a Public Safety Access Point (PSAP) by employing a processor executing computer executable instructions stored on a computer readable storage medium to implement the following acts: Data packet communication is transferred between user equipment and a PSAP. The data packet communication is identified as an emergency call. A header is relayed for communication from the PSAP to the user equipment identifying the call as an emergency call for prompting the user equipment to perform priority handling of the emergency call.

In yet another aspect, a computer program product is provided for a network to facilitate performing priority handling of an emergency call by user equipment establishing communication with a Public Safety Access Point (PSAP). A processor is operatively coupled to a computer readable medium having stored thereon the following computer executable components: A set of codes causes a computer to transfer data packet communication between user equipment and a PSAP. A set of codes causes the computer to identify the data packet communication as an emergency call. A set of codes causes the computer to relay a header for communication from the PSAP to the user equipment identifying the call as an emergency call for prompting the user equipment to perform priority handling of the emergency call.

In yet an additional aspect, an apparatus is provided for a network to facilitate performing priority handling of an emergency call by user equipment establishing communication with a Public Safety Access Point (PSAP) comprising at least one computer readable storage medium storing computer executable instructions that when executed by at least one processor implement components. Means are provided for transferring data packet communication between user equipment and a PSAP. Means are provided for identifying the data packet communication as an emergency call. Means are provided for relaying a header for communication from the PSAP to the user equipment identifying the call as an emergency call for prompting the user equipment to perform priority handling of the emergency call.

In yet a further aspect, an apparatus is provided for a network to facilitate performing priority handling of an emergency call by user equipment establishing communication with a Public Safety Access Point (PSAP). An uplink and a downlink transfer data packet communication between user equipment and a PSAP. A computing platform identifies the data packet communication as an emergency call. The downlink further relays a header for communication from the PSAP to the user equipment identifying the call as an emergency call for prompting the user equipment to perform priority handling of the emergency call.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
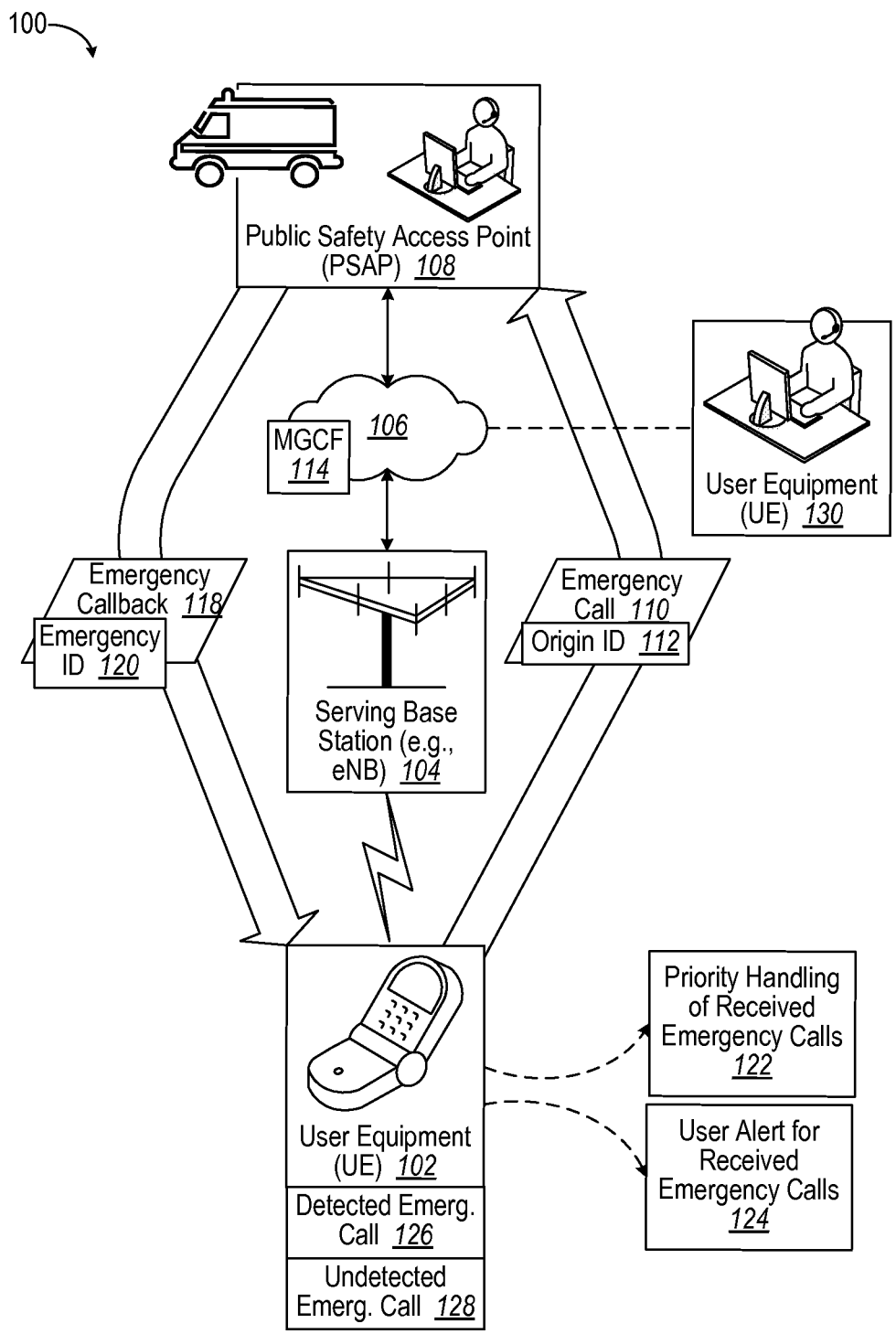
FIG. 1 illustrates a block diagram of user equipment (UE) receiving an emergency call from a public safety access point (PSAP).

Referring initially to FIG. 1, a communication system 100 enables a mobile device or user equipment (UE) 102 to wirelessly communicate via a radio access network (RAN), depicted as a serving evolved Base Node (eNB) 104 to an Internet Protocol Multimedia Subsystem (IMS) 106 to a Public Safety Access Point (PSAP) 108. The mobile/UE 102 can initiate an emergency call 110 with sufficient identification of origin 112, which can be network assigned such as by a Media Gateway Control Function (MGCF) 114. In one aspect, the MGCF can set the P-Asserted-Identity and/or the Priority header to the value indicative of an emergency call from the PSAP. Should the emergency call be interrupted or otherwise released, the PSAP 108 can initiate an emergency callback 118 that carries an emergency identification 120 that can be recognized by the mobile/UE 102 for performing priority handling (block 122) and for alerting a user (block 124). Priority handling can entail dropping or placing on hold an ongoing communication session. It can entail disabling distracting features such as three-way calling, call waiting, short messaging service (SMS), multimedia streaming, etc.

The RAN 104 can comprise an Internet Protocol Connectivity Access Network (IP-CAN) that supports emergency services. In particular, the mobile/UE 102 can access the IP-CAN 104 without sufficient security credentials, although the IP-CAN 104 can reject requests from UE 102 without sufficient security credentials to establish bearer resources. In the case that the IP-CAN 104 receives a request to establish bearer resources for emergency services, it shall be possible for the IP-CAN to prioritize emergency services traffic. PCC (Policy and Charging Control) methods may be used to inform the IP-CAN 104 and request appropriate handling of the emergency service. In the case that the IP-CAN 104 receives a request to establish bearer resources for emergency services, the IP-CAN 104 ensures that the IP flows using the requested resources are only for communication with the network entities involved in the support of the emergency services. The IP-CAN 104 may provide emergency numbers to the UE 102 in order to ensure that local emergency numbers are known to the UE.

A detected emergency call component 126 of the UE 102 can advantageously recognize that an initiated call is to a PSAP, and thus is an emergency call. Alternatively or in addition, an undetected emergency call component 128 of the UE 102 can be responsive to network information that identifies a UE-initiated call or a PSAP-initiated call or callback as an emergency call.

Although the illustrative implementation described herein advantageously addresses wireless communication, it should be appreciated that aspects can be applied to user equipment (UE) 130 can be coupled in other manners to the IMS 106 (e.g., Voice over IP (VoIP) via a wired network connection).

Figure 2:
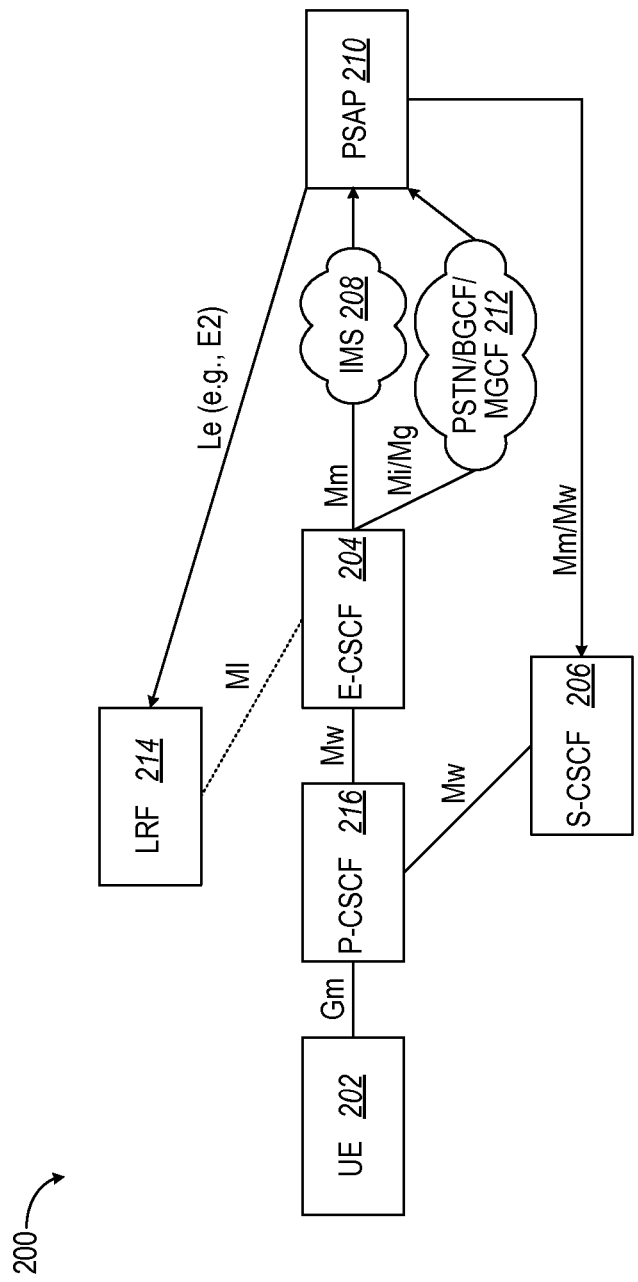
FIG. 2 illustrates a block diagram of a communication network for facilitating emergency calls and callback and prioritized response by a mobile/UE.

In FIG. 2, a communication network 200 for facilitating emergency calls and callback and prioritized response by a mobile/UE 202 advantageously includes an additional call session control function (CSCF) role, specifically an Emergency CSCF ("E-CSCF") 204. The E-CSCF 204 uses an Mw reference point to connect to a Serving CSCF 206. The E-CSCF 204 uses an Mw reference point to connect to connect to the IMS 208, which in turn connects to a PSAP 210. The E-CSCF 204 uses Mi/Mg reference points to connect to a publicly switched telephone network (PSTN) 212, a Breakout Gateway Control Function (BGCF) and MGCF 212. The E-CSCF 204 uses an M1 reference point to connect to a location retrieval function (LRF) 214. The PSAP 210 connects via reference point Le reference point (e.g., E2) to LRF 214 and via reference points Mm/Mw to S-CSCF 206. The E-CSCF 204 connects via reference point Mw to a Proxy CSCF 216, which in turn connects via Gm reference point to the mobile/UE 202.

The UE 202 should be able in many instances to detect an emergency session establishment request. For example, a special emergency Public User Identifier in the IMS emergency registration request can be used. The UE 202 may perform an IMS emergency session establishment without prior emergency registration when already IMS registered and is in its home network (e.g., including IP-CANs where roaming outside the home network is not supported). Otherwise, the UE 202 can perform an IMS emergency registration, which can include an emergency service indication in the emergency session request. Further, it can include an equipment identifier in the request to establish an emergency session for "anonymous user" when the context is that the person who does not have sufficient credential for IMS registration. The UE 202 can include identity information for the IP-CAN if available (e.g., MCC-MNC or an equivalent). The UE 202 may be dual mode, capable of attempting the emergency call in circuit switched (CS) domain. As such, the priority handling can entail switching or placing on hold the CS session in favor of an IMS received emergency call. The UE 202 can handle a 380 (Alternative Service) response with the type set to "emergency" as a result of non UE detectable emergency attempt. The UE 202 can handle a response with an indication, IMS emergency registration required as a result of emergency session establishment attempt.

In the illustrative case, the UE 202 initiates the emergency session establishment request, and for the purpose of processing the request properly in the network the following specific information is supplied in the request message. The UE 202 provides an emergency session indication and provides an emergency Public User Identifier if an IMS emergency registration is performed. If not, any registered Public User Identifier is used. The UE 202 may be able to provide a telephone uniform resource indicator (URI) associated to the emergency Public User Identifier, if available. The UE 202 may also be capable of providing location in some instances.

Location information is needed for two main reasons in emergency services. The initial purpose of the location information is to enable the IMS network 208 to determine which PSAP 210 serves the area where the UE 202 is currently located, so that the IMS network 208 can route the emergency session to the correct PSAP 210. The second purpose is for the PSAP 210 to get more accurate or updated location information for the terminal during or after the emergency session. If the UE 202 has location information available, the UE 202 includes the location information in the request to establish an emergency session. The location information may consist of network location information, that is the location identifier, and/or the geographical location information. The P-CSCF 216 may query the IP-CAN (FIG. 1) to obtain location identifier. The E-CSCF 204, if required, may query the LRF 214 for additional location information. If the E-CSCF 204 does not receive location information in the emergency service request, it may query the LRF 214 for location information. The E-CSCF 204 can query the LRF 214 to validate the location information if provided initially by the UE 202.

Thus, the Location Retrieval Function (LRF) 214 is responsible for retrieving the location information of the UE that has initiated an IMS emergency session. It shall be possible to support configurations where the Location Retrieval Function (LRF) may consist of a Routing Determination Function (RDF) and a Location Server (e.g., Gateway Mobile Location Center (GMLC)). The LRF utilizes the RDF to provide the routing information to the E-CSCF for routing the emergency request. The RDF can interact with a location functional entity (e.g., GMLC) and manage ESQK allocation and management. The ESQK is used by the PSAP to query the LRF for location information and optionally a callback number. The LRF-PSAP interactions are outside the scope of this specification.

Information provided by the LRF 214 to the E-CSCF 204 includes the routing information and other parameters necessary for emergency services, which are subject to local regulation. For example, this information may include the ESQK, ESRN, LRO in North America, location number in EU, PSAP SIP URI or Tel URI. In order to provide the correct PSAP destination address to the E-CSCF 204, the LRF 214 may require interim location information for the UE 202.

In some regions, for example in the North American region, it may be a requirement to provide the PSAP 210 with an accurate initial location estimate for the UE and possibly to provide an accurate updated location estimate for the UE 202 if requested by the PSAP 210. When this requirement exists, the LRF 214 may store a record of the emergency session including all information provided by the E-CSCF 204 and shall only release this record when informed by the E-CSCF 204 that the emergency session has terminated. The information provided by the LRF 214 to the E-SCF 204 (e.g., ESQK) shall then include correlation information identifying both the LRF 214 and the emergency session record in the LRF 214. This correlation information shall be transferred to the PSAP 210 during session establishment (e.g., in a SIP INVITE or via SS7 ISUP signaling from the MGCF). The PSAP 210 may use this information to request an initial location estimate from the LRF 214 and/or to request an updated location estimate.

The E-CSCF 204 routes the emergency request to the PSAP/Emergency Center 210 that corresponds to the current location of the UE 202 or to a default PSAP/Emergency Center 210, the method of which can vary based upon whether I WLAN or fixed broadband access is being used by the UE 202 for the emergency service. The E-CSCF 204 forwards the SIP request containing the UE's location information to the PSAP/Emergency Center 210 or BGCF/MGCF 212. The location information can contain explicit location information and/or a reference key to allow the PSAP 210 to retrieve location at a later stage.

Further, the Emergency CSCF 204 receives an emergency session establishment request from a P-CSCF 216. If location information is not included in the emergency request or additional location information is required, the E-CSCF 204 may request the LRF 214 to retrieve location information. If required, the E-CSCF 204 requests the LRF 214 to validate the location information if included by the UE. The E-CSCF 204 determines or queries the LRF 214 for the proper routing information/PSAP destination, routes emergency session establishment requests to an appropriate destination including anonymous session establishment requests, can send the contents of the P-Asserted-Identity or UE identification to the LRF 214, and can route the emergency IMS call to Emergency Calling Service (ECS) for further call process.

With further regard to the other IMS functional entities, the Proxy CSCF 216 handles registration requests with an emergency Public User Identifier like any other registration request, except that it may reject an emergency registration request if the IP Multimedia Core Network (IM CN) subsystem that the P-CSCF 216 belongs to cannot support emergency sessions for the UE 202 (e.g., due to local policy or UE 202 is not within the IM CN subsystem's geographical area or the IP-CAN is not supported). The P-CSCF 216 detects an emergency session establishment request, rejects/allows unmarked emergency requests, rejects/allows anonymous emergency requests, prevents the assertion of an emergency Public User Identifier in non-emergency requests, prevents non-emergency requests that are associated with an emergency registration, may query IP-CAN for a location identifier, and selects an Emergency CSCF in the same network to handle the emergency session request. The selection method is not standardized in the present document, prioritizes the emergency session, checks the validity of the caller Tel URI if provided by the UE and shall provide the Tel URI in the session establishment request if it is aware about the Tel URI associated with the emergency Public User Identifier, may respond to a UE 202 with an emergency session indication as a result of detecting a non UE detectable emergency session establishment request, may respond to the UE 202 with an indication, IMS emergency registration required as a result of processing the emergency session establishment attempt, and should be able to identify the service data flow associated with emergency service and inform Policy and Charging Rules Function (PCRF) (not shown) accordingly.

When the S-CSCF 206 receives an Emergency Registration, the S-CSCF 206 determines the duration of the registration by checking the value of the Expires header in the received REGISTER request and based on local policy of the serving system.

Figure 3A:
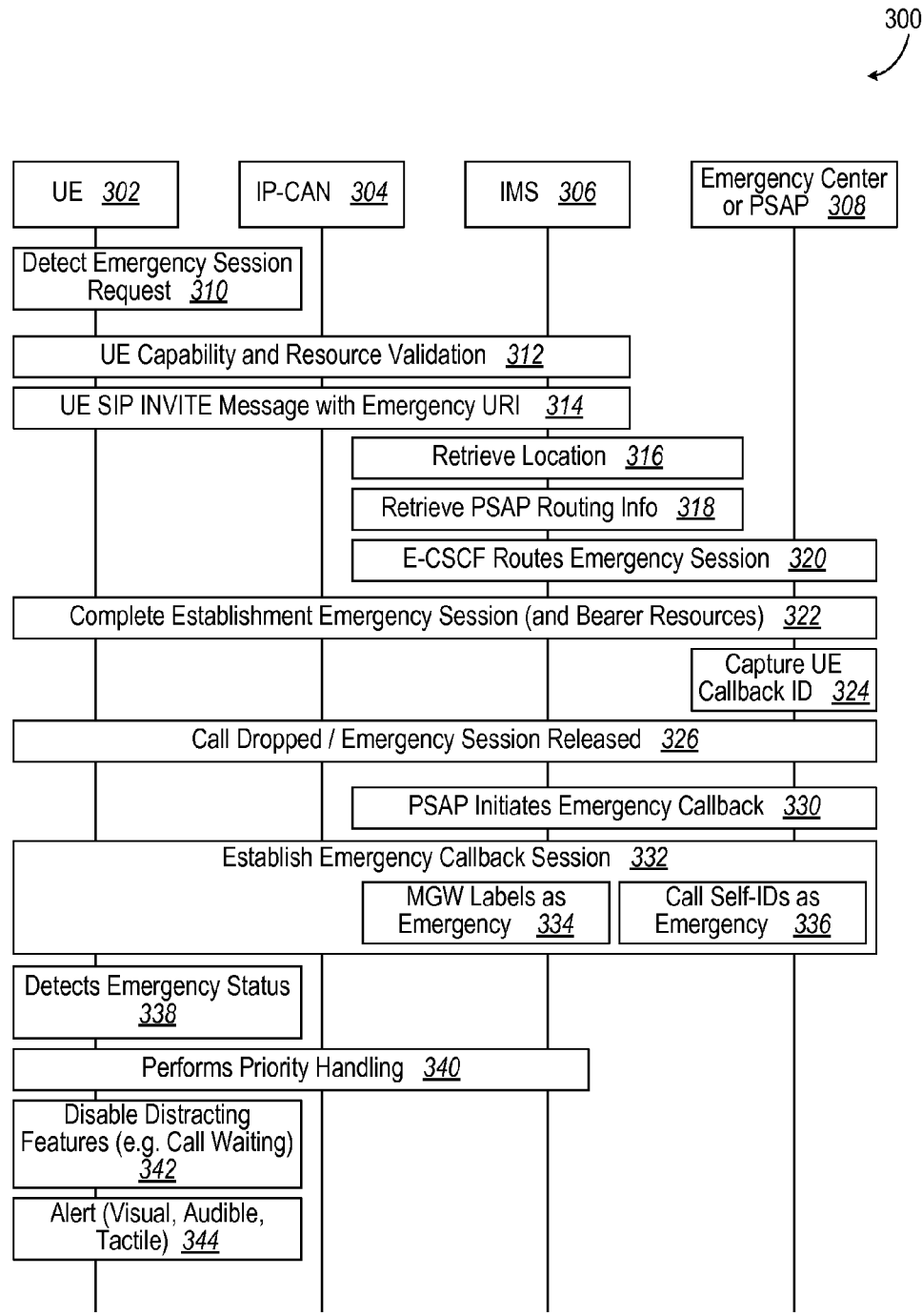
FIGS. 3A-3B illustrate a timing diagram of a methodology for priority handling at UE for a received emergency call.

In FIG. 3A, a methodology or sequence of operations 300 performed by a UE 302, IP-CAN 304, IMS network 306, and Emergency Center/PSAP 308 for prioritized handling of emergency calls at the UE 302. In block 310, the UE detects the request as the establishment of an emergency session. For instance, PSAP initiates a new call to the UE (i.e., PSAP Callback case)—the UE 302 can identify this call as an emergency call based on the SIP header value (e.g., P-Asserted-Identity or Priority). The header value can be inserted by the MGCF or by the PSAP itself (or some other network entity on behalf of the PSAP).

In the case that the UE 302 has insufficient resources or capabilities to establish an emergency call due to other ongoing sessions, then the UE should terminate the ongoing communication and release reserved bearer resources (block 312). In some instances, the UE 302 needs assistance or verification of location. To that end, the IMS network 306 can assist in emergency session establishment using LRF/RDF to retrieve location and routing information in response to UE 302 initiating an emergency session request by sending a SIP INVITE message with including emergency URI (block 314). If required, the IMS network 306 may access the LRF to retrieve the UE's location (block 316). If required, LRF invokes the RDF to determine the proper PSAP destination (block 318). LRF returns the necessary location/routing information (e.g., ESQK for North America or location number for EU) to the IMS network. The IMS network 306 uses the routing information returned by the LRF to route the emergency session request towards the appropriate PSAP 308 (block 320). (If the LRF provides an ESQK to the IMS network 306 or assigns any other dedicated resource to the emergency session, the IMS network 306 informs the LRF when the session is released in order to allow the LRF to release this resource.)

Then the emergency session and bearer resources establishment are completed with the PSAP 308 (block 322). Thus, if IMS emergency registration is performed, the UE 302 initiates the IMS emergency session establishment using the IMS session establishment procedures containing an emergency session indication and emergency Public User Identifiers. Otherwise, the UE 302 initiates the IMS emergency session establishment using the IMS session establishment procedures containing an emergency session indication and any registered Public User Identifier. Whether the procedures are activated individually by the UE 302 or some of them are performed automatically depends on the implementation of the terminal and on the UE's configuration. For instance, the multimedia application in the UE 302 could start the application level registration and the routing would have to be executed in response to support the operation initiated by the application. Interaction with the UE 302 may happen during these steps.

With the emergency call session established, the PSAP 308 captures sufficient information about the emergency caller (UE 302) for purposes such as being able callback (block 324). Thus, the PSAP 308 is prepared should the emergency session be interrupted or released (block 326). The PSAP 308 can initiate an emergency callback (block 330). Advantageously, the emergency callback bears identification as an emergency call in its establishing communications (block 332), depicted as the MGW labeling the call as emergency or emergency callback (block 334) or by the call being self-identified as originating from an emergency center/PSAP (block 336).

After or during the emergency callback session being established with the UE 302, the UE 302 detects the emergency status of the call (block 338). The UE 302 performs priority handling, such as placing on hold or dropping any second sessions to free up capacity and to remove user distractions (block 340). Further, the UE 302 can prevent further impediments by disabling features that would obscure or distract from the emergency call, such as disabling call waiting, three-way calling, multimedia streaming/playback sessions, device silencing/sleep mode, etc. (block 342). The UE 302 performs a user alert, such as a visual, audible and tactile alert (block 344).

Figure 3B:
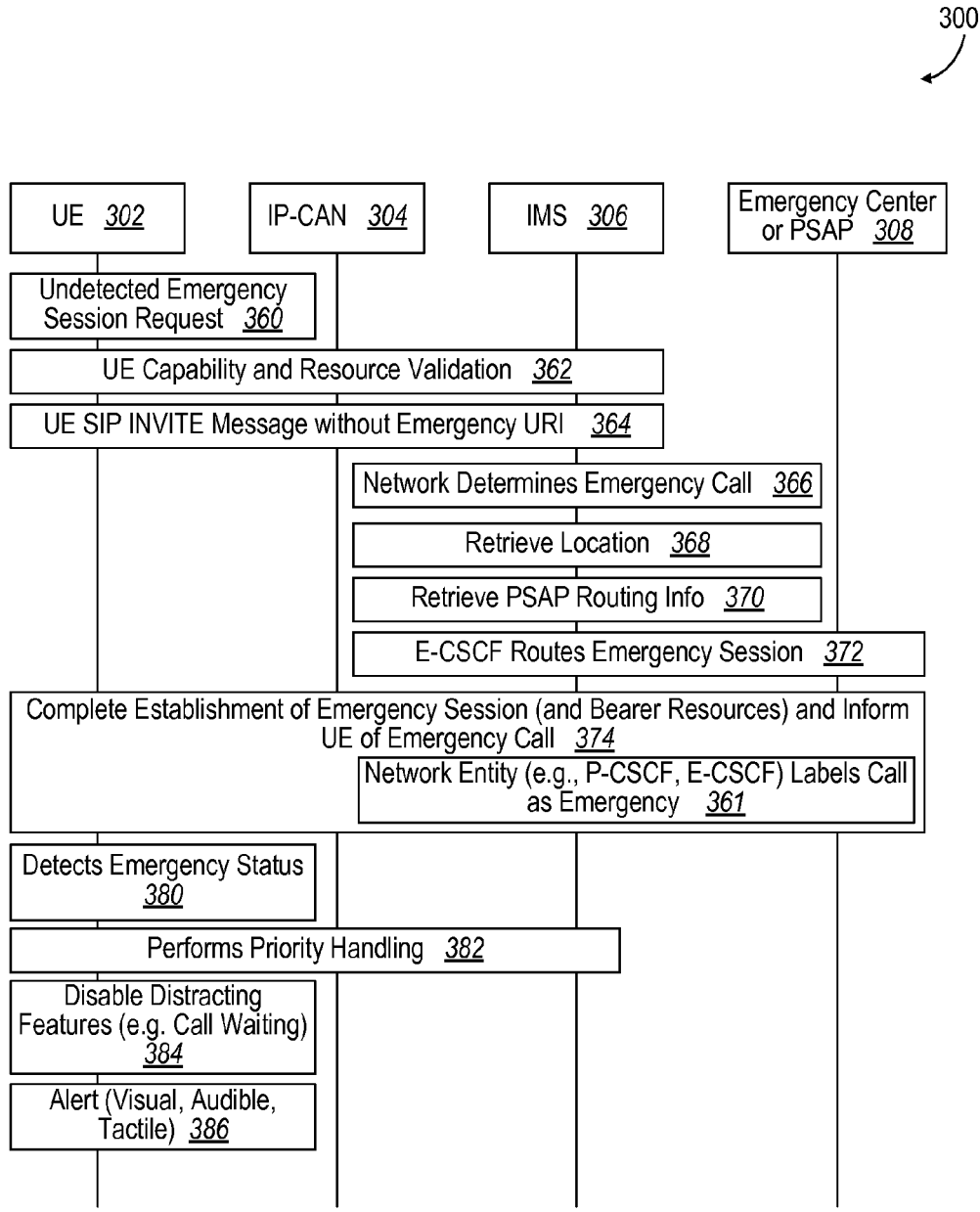

Continuing methodology 300 in FIG. 3B, the UE 302 makes a call similarly as described above in FIG. 3A but fails to detect the request as the establishment of an emergency session (block 360). For instance, the UE makes an "UE-undetected emergency call." This happens, for example, when the UE is roaming in a different country and dials a local emergency number. Here, the emergency number is recognized by the local network and the call is dispatched to a PSAP. The UE is also told by the network (E-CSCF, P-CSCF, etc) that the call it made is an emergency call (block 361). Similar to the previous use case, the network can use a P-Asserted-Identity or a Priority header to tell the UE about the emergency call.

If the UE 302 could not detect the emergency session at block 360, the session establishment request can be sent to a P-CSCF in the visited Public Land Mobile Network (PLMN) or a P-CSCF in the home PLMN as per a normal session establishment procedure. The former is applicable to a roaming situation whereas the latter can apply to both a roaming and non-roaming situation. Prior to sending the session establishment request the UE 302 is registered in the IMS network 306 as per the normal registration procedure. In the case that the P-CSCF detects that this is a request to establish an emergency session, based upon local policy (e.g., checking access type), then the P-CSCF may reject the session initiation request with an indication that this is for an emergency session. When the UE 302 receives the session rejection, then the UE 302 either attempts to initiate an emergency call in the CS domain or in the IMS domain as described above. Alternatively, the P-CSCF in the visited PLMN or the P-CSCF in the home PLMN for a non-roaming UE 302 allows the session initiation request to continue by inserting the explicit emergency indication in the session request and forward that request to an Emergency CSCF in the same network. There is no requirement to inform the UE 302 that the session has been marked as an emergency session, i.e., the UE can treat the session as a normal session establishment.

In the case that the UE 302 has insufficient resources or capabilities to establish an emergency call due to other ongoing sessions, then the UE should terminate the ongoing communication and release reserved bearer resources (block 362). In some instances, the UE 302 needs assistance or verification of location. To that end, the IMS network 306 can assist in emergency session establishment using LRF/RDF to retrieve location and routing information in response to UE 302 initiating an emergency session request by sending a SIP INVITE message without including emergency URI (block 364). The IMS network 306 may access the LRF to retrieve the UE's location (block 366). Such an action can be prompted by the network determining that the call is an emergency call (block 366), such as by recognizing that the call to or from the PSAP 308 is an emergency call.

If required, LRF invokes the RDF to determine the proper PSAP destination (block 370). LRF returns the necessary location/routing information (e.g., ESQK for North America or location number for EU) to the IMS network. The (E-CSCF) of the IMS network 306 uses the routing information returned by the LRF to route the emergency session request towards the appropriate PSAP 308 (block 372).

Advantageously, the emergency call bears identification as an emergency call in its establishing communications (block 374), depicted as the MGW labeling the call as emergency or emergency callback (block 376) or by the call being self-identified as originating from an emergency center/PSAP (block 378). After or during the emergency call session being established with the UE 302, the UE 302 detects the emergency status of the call (block 380). The UE 302 performs priority handling, such as placing on hold or dropping any second sessions to free up capacity and to remove user distractions (block 382). Further, the UE 302 can prevent further impediments by disabling features that would obscure or distract from the emergency call, such as disabling call waiting, three-way calling, multimedia streaming/playback sessions, device silencing/sleep mode, etc. (block 384). The UE 302 performs a user alert, such as a visual, audible and tactile alert (block 386).

Figure 4:
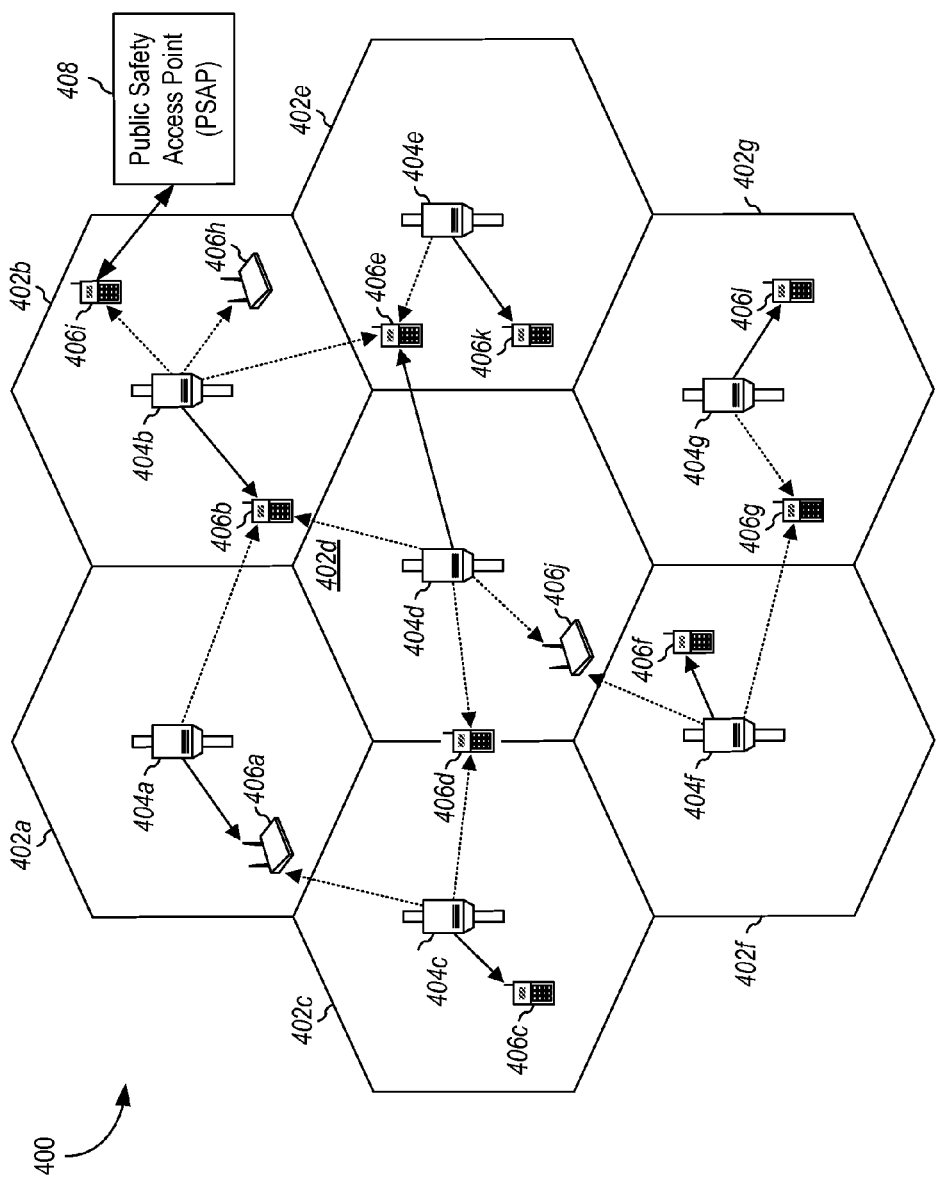
FIG. 4 illustrates a block diagram of an exemplary communication system.

FIG. 4 illustrates an exemplary communication system 400 configured to support a number of users, in which various disclosed embodiments and aspects may be implemented. As shown in FIG. 4, by way of example, system 400 provides communication for multiple cells 402, such as, for example, macro cells 402a-402g, with each cell being serviced by a corresponding access point (AP) 404 (such as APs 404a-404g). Each cell may be further divided into one or more sectors. Various access terminals (ATs) 406, including ATs 406a-406k, also known interchangeably as user equipment (UE), are dispersed throughout the system. Each AT 406 may communicate with one or more APs 404 on a forward link (FL) and/or a reverse link (RL) at a given moment, depending upon whether the AT is active and whether it is in soft handoff, for example. The wireless communication system 400 may provide service over a large geographic region, for example, macro cells 402a-402g may cover a few blocks in a neighborhood. In one aspect, the system 400 further includes a Public Safety Access Point (PSAP) 408, which is a Public Switched Telephone Network (PSTN) termination point where emergency calls are received and then routed to the appropriate emergency services.

Figure 5:
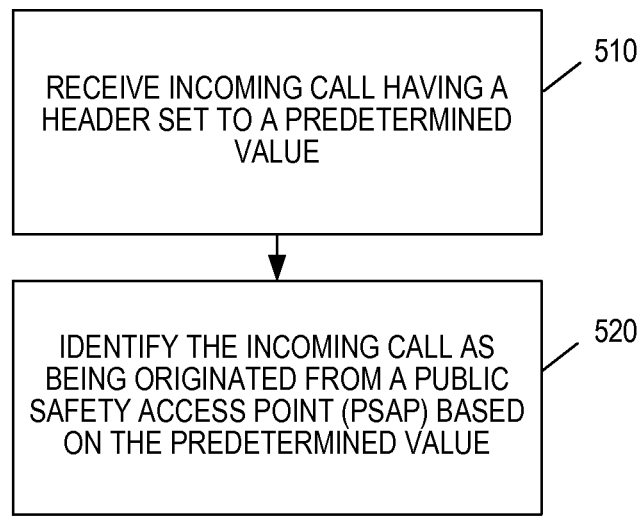
FIG. 5 illustrates a flow diagram of a methodology or sequence of operations to facilitate identification of calls originated from a public safety access point (PSAP), according to one aspect of the invention.

FIG. 5 illustrates a method to facilitate identification of calls originated from a public safety access point (PSAP), according to one aspect of the invention. When a mobile station or UE makes an emergency call and the call is disconnected or terminated, the PSAP may choose to call back the UE. When such a callback happens, the UE needs to know that the callback originates from the PSAP, so that it can terminate any ongoing calls and accept this incoming call from the PSAP. In addition, if the UE identifies the incoming call as a callback from the PSAP, it can disable certain supplementary features, such as, for example, call waiting, three-way calling, etc. during the incoming call.

In one aspect, at processing block 510, an incoming call having a header set to a predetermined value is received at the UE. In one aspect, the header is a P-Asserted-Identity header, which may be set to a predetermined value, such as, for example, a predetermined string "urn:services:sos", or any other specified value which identifies the call as originating from the PSAP. In an alternate aspect, the P-Asserted-Identity header may include additional information, which indicates that the callback (or the call) originated at the PSAP. The additional information may include, for example, a Uniform Resource Identifier (URI) parameter, which indicates that the call is from a PSAP. The URI parameter may further include a value "urn:services:sos," or, in the alternative, some other predetermined value to indicate that the call is a callback.

In another alternate aspect, the header is a Priority header, which may be set to a predetermined value, such as, for example, an emergency value, or a predetermined "emergency-callback" value, or any other specified value which identifies the call as originating from the PSAP. In one aspect, if the incoming call occurs from the PSTN, a Media Gateway Control Function (MGCF), which is provided as an interface between the PSTN and an IMS entity, sets the P-Asserted-Identity header and/or the Priority header to the specific value. Alternatively, any network entity may set the corresponding header to the predetermined value.

In one aspect, at processing block 520, the incoming call is identified as being originated from the PSAP based on the predetermined value. The UE processes the incoming header and identifies the call as originating from the PSAP based on the predetermined value, and, thus, may terminate any ongoing calls, accept this incoming call, and disable any features that may interfere with the call.

Figure 6:
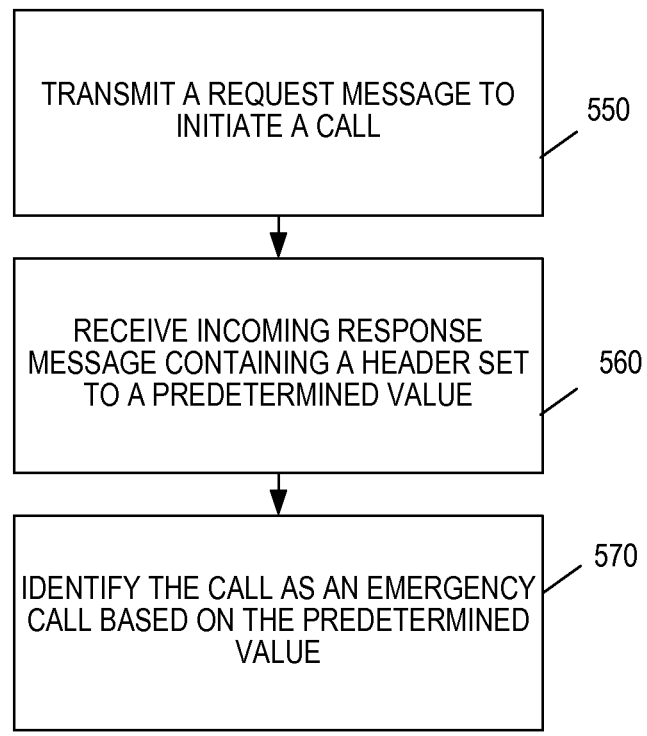
FIG. 6 illustrates a flow diagram of a methodology or sequence of operations to facilitate identification of undetected emergency calls, according to one aspect of the invention.

FIG. 6 illustrates a method to facilitate identification of undetected emergency calls, according to one aspect of the invention. When a mobile station or UE makes an emergency call, it may identify the call based on the number sequence only if the number sequence is known to the UE. For emergency calls that may not be identified by the number sequence, the UE needs to be made aware that it is dialing an emergency call, so that it may disable certain supplementary features, such as, for example, call waiting, three way calling, etc. during the call.

In one aspect, at processing block 550, the UE transmits a request message to initiate a call within the network. At processing block 560, an incoming response message having a header set to a predetermined value is received at the UE. In one aspect, the header is a P-Asserted-Identity header, which may be set to a predetermined value, such as, for example, a predetermined emergency string value, or any other specified value which identifies the initiated call as an emergency call, or may contain additional information, such as, for example, a URI parameter, as described above. In an alternate aspect, the header is a Priority header, which may be set to a predetermined value, such as, for example, an emergency value, or any other specified value which identifies the initiated call as an emergency call. In one aspect, a Media Gateway Control Function (MGCF), or any other network entity, may set the P-Asserted-Identity header and/or the Priority header to the specific value.

Finally, at processing block 570, the initiated call is identified as an emergency call based on the predetermined value. The UE processes the incoming header and identifies the call as an emergency call based on the predetermined value.

Figure 7:
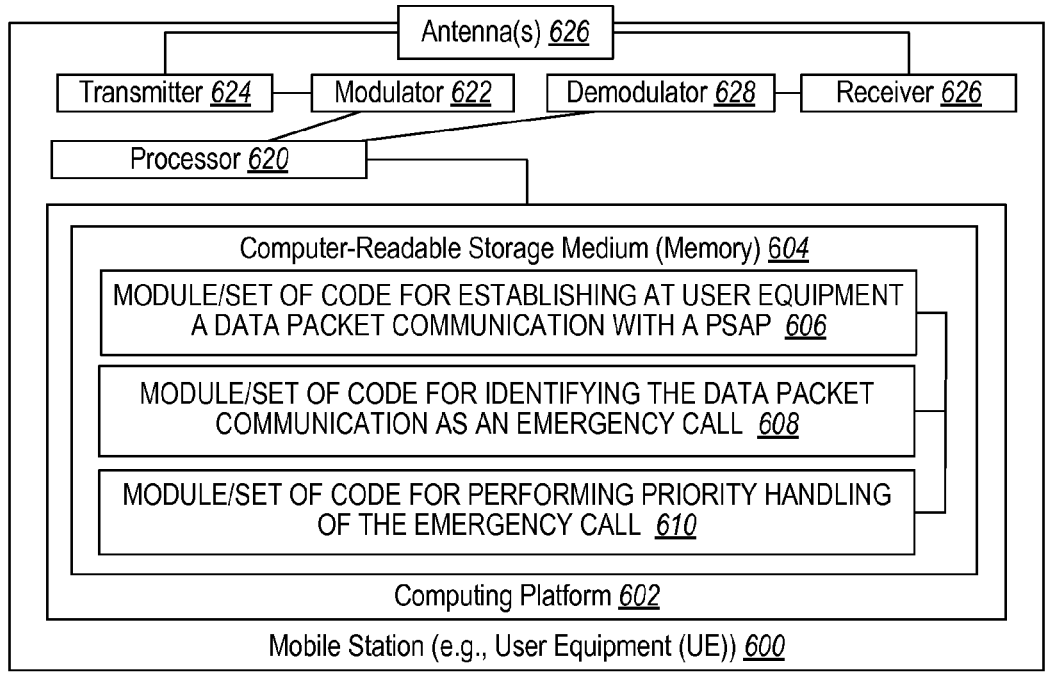
FIG. 7 illustrates a block diagram of a computing platform and transceiving components of user equipment for priority handling of received emergency calls.

With reference to FIG. 7, a mobile station, depicted as user equipment (UE) 600, has a computing platform 602 that provides means such as sets of codes for causing a computer to perform an emergency call using user equipment communicating with a Public Safety Access Point (PSAP). In the illustrative aspect, these calls are made via IMS. In particular, the computing platform 602 includes a computer readable storage medium (e.g., memory) 604 that stores a plurality of modules 606-610 executed by a processor(s) 620. A modulator 622 controlled by the processor 620 prepares an uplink signal for modulation by a transmitter 624, radiated by antenna(s) 626 as depicted at 627 to the eNB 600. A receiver 626 receives downlink signals from the eNB 600 from the antenna(s) 626 that are demodulated by a demodulator 628 and provided to the processor 620 for decoding. In particular, means (e.g., module, set of codes) 606 are provided for establishing at user equipment a data packet communication with a PSAP. Means (e.g., module, set of codes) 608 are provided for identifying the data packet communication as an emergency call. Means (e.g., module, set of codes) 610 are provided for performing priority handling of the emergency call.

Figure 8:
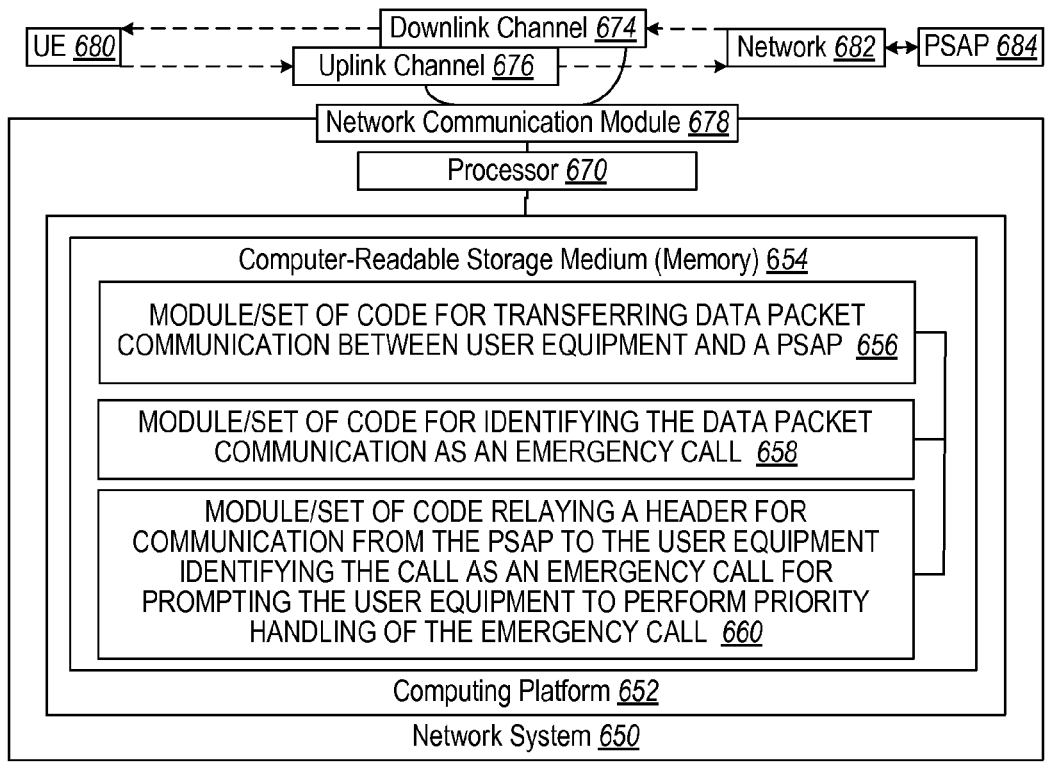
FIG. 8 illustrates a block diagram of a computing platform and transceiving components of a network system for facilitating priority handling by a UE of emergency calls.

In FIG. 8, a network system 650 has a computing platform 652 that provides means such as sets of codes for causing a computer to facilitate priority handling of emergency calls by user equipment that is establishing communication with a Public Safety Access Point (PSAP). In the illustrative aspect, these calls are made via IMS. In particular, the computing platform 652 includes a computer-readable storage medium (e.g., memory) 654 that stores a plurality of modules 656-660 executed by a processor(s) 670. In particular, means (e.g., module, set of codes) 606 are provided for establishing at user equipment a data packet communication with a PSAP. Means (e.g., module, set of codes) 608 are provided for identifying the data packet communication as an emergency call. Means (e.g., module, set of codes) 610 are provided for performing priority handling of the emergency call. These means 556-660 effect this two-way communication on a downlink channel 674 and uplink channel 676 via a network communication module 678 between UE 680 and network 682 that links to PSAP 684.

Figure 9:
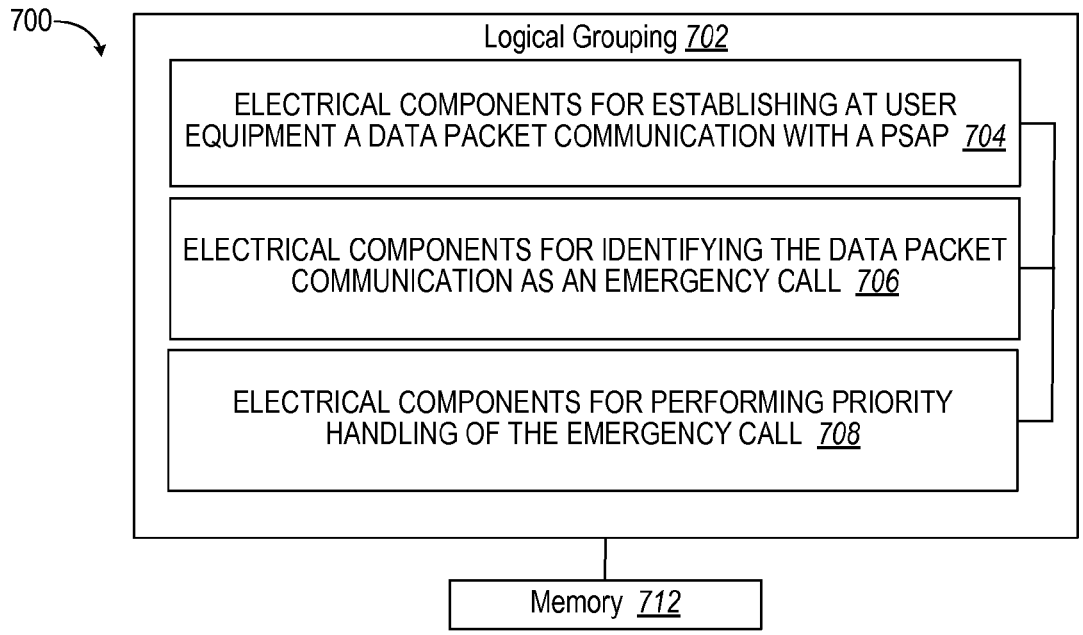
FIG. 9 illustrates a block diagram of a system comprising a logical grouping of electrical components for priority handling of emergency calls.

With reference to FIG. 9, illustrated is a system 700 that performs priority handling of an emergency call using user equipment communicating with a Public Safety Access Point (PSAP). For example, system 700 can reside at least partially within user equipment (UE). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for establishing at user equipment a data packet communication with a PSAP 704. Moreover, logical grouping 702 can include an electrical component for identifying the data packet communication as an emergency call 706. Further, logical grouping 702 can include an electrical component for performing priority handling of the emergency call 708. Additionally, system 700 can include a memory 712 that retains instructions for executing functions associated with electrical components 704, 706, and 708. While shown as being external to memory 712, it is to be understood that one or more of electrical components 704, 706 and 708 can exist within memory 712.

Figure 10:
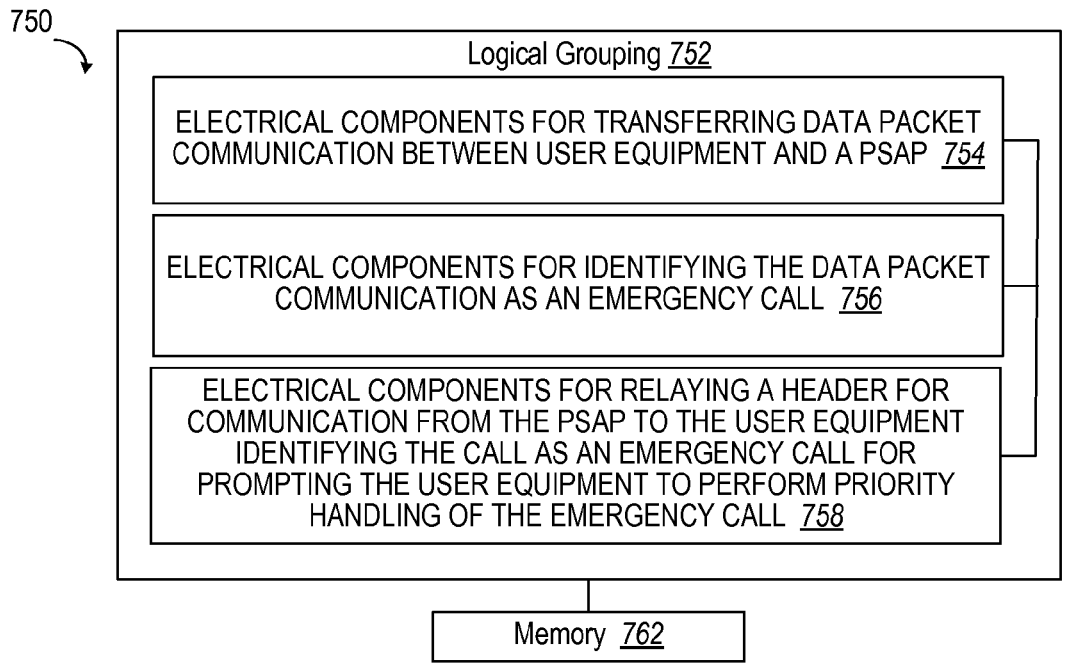
FIG. 10 illustrates a block diagram of a system comprising a logical grouping of electrical components for a network to facilitate priority handling of emergency calls by user equipment.

With reference to FIG. 10, illustrated is a system 750 that facilitates user equipment performing priority handling of an emergency call when establishing communication with a Public Safety Access Point (PSAP). For example, system 750 can reside at least partially within network that participates in or controls at least a portion of uplink and downlink between UE and PSAP. It is to be appreciated that system 750 is represented as including functional blocks, which can be functional blocks that represent functions implemented by a processor, software, or a combination thereof (e.g., firmware). System 750 includes a logical grouping 752 of electrical components that can act in conjunction. For instance, logical grouping 752 can include an electrical component for transferring data packet communication between user equipment and a PSAP. Moreover, logical grouping 752 can include an electrical component for identifying the data packet communication as an emergency call 756. Further, logical grouping 752 can include an electrical component for relaying a header for communication from the PSAP to the user equipment identifying the call as an emergency call for prompting the user equipment to perform priority handling of the emergency call 758. Additionally, system 750 can include a memory 762 that retains instructions for executing functions associated with electrical components 754, 756, and 758. While shown as being external to memory 762, it is to be understood that one or more of electrical components 754, 756 and 758 can exist within memory 762.

Figure 11:
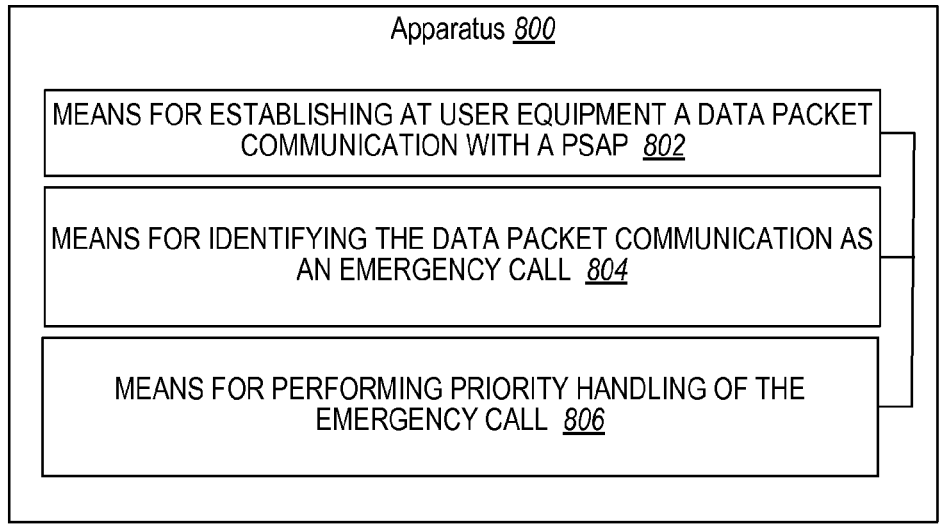
FIG. 11 illustrates a block diagram of an apparatus having means for priority handling of emergency calls.

With reference to FIG. 11, illustrated is an apparatus 800 that performs priority handling of an emergency call using user equipment communicating with a Public Safety Access Point (PSAP). Means 802 are provided for establishing at user equipment a data packet communication with a PSAP. Means 804 are provided for identifying the data packet communication as an emergency call. Means 806 are provided for performing priority handling of the emergency call.

Figure 12:
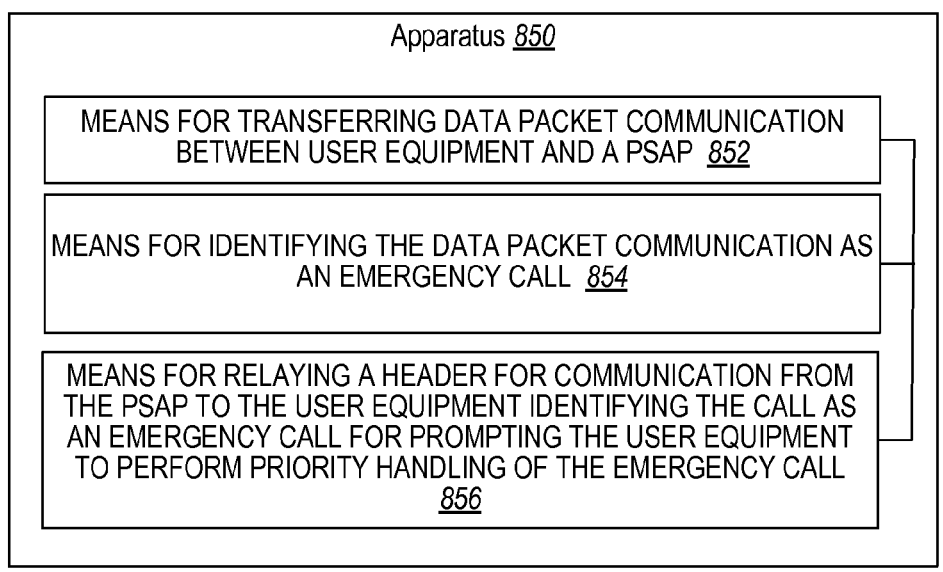
FIG. 12 illustrates a block diagram of an apparatus having means for facilitating priority handling of emergency calls by user equipment.

In FIG. 12, illustrated is an apparatus 850 that facilitates performing priority handling of an emergency call by user equipment establishing communication with a Public Safety Access Point (PSAP). Means 852 are provided for transferring data packet communication between user equipment and a PSAP. Means 854 are provided for identifying the data packet communication as an emergency call. Means 856 are provided for relaying a header for communication from the PSAP to the user equipment identifying the call as an emergency call for prompting the user equipment to perform priority handling of the emergency call.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The word "exemplary" is used herein to mean "serving as an example, instance, or illustration." Any aspect described herein as "exemplary" is not necessarily to be construed as preferred or advantageous over other aspects. The disclosed aspects may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards. The disclosed aspects may be applied to wireless communication networks, as well as, in the alternative, to wired communication networks.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or."

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for a network to prompt a user equipment to priority handle an emergency call with a Public Safety Access Point (PSAP), comprising:
   establishing, by the PSAP, a communication session with the user equipment;
   transmitting a data packet communication originating from the PSAP to the user equipment, wherein the transmitted data packet communication includes a header that identifies the communication session as an emergency call and prompts the user equipment to interrupt a current communication session and thereby priority handle the emergency call: and
   setting an "emergency-callback" value in the header to identify the communication session as the emergency call.

2. The method of claim 1, further comprising relaying the header by wirelessly communicating between a radio access node and the user equipment.

3. The method of claim 1, further comprising:
   receiving a call initiated by the user equipment to the PSAP;
   detecting that the user equipment identified the call as an emergency call; and
   transmitting the data packet communication having the header that identifies the communication session as the emergency call to facilitate a callback from the PSAP to the user equipment in response to determining that the emergency call initiated by the user equipment released.

4. The method of claim 1, further comprising:
   receiving a call request initiated by the user equipment to the PSAP that is not self-identified as an emergency session establishment request; and
   transmitting the data packet communication having the header that identifies the communication session as an emergency call to indicate that a network detected that the user equipment initiated the call request to establish the emergency call.

5. The method of claim 1, further comprising transmitting the data packet communication from an Internet Protocol Multimedia Subsystem (IMS) coupled to the PSAP, wherein the header is set by a media gateway control function (MGCF).

6. The method of claim 1, further comprising relaying a P-asserted Identity header set by the PSAP originating a Session Initiation Protocol (SIP) message.

7. The method of claim 1, further comprising relaying a P-asserted Identity header set by a media gateway control function (MGCF) originating a Session Initiation Protocol (SIP) message.

8. The method of claim 7, further comprising relaying the P-Asserted Identity header set to a Uniform Resource Identifier (URI) indicating that the emergency call originates from the PSAP.

9. The method of claim 8, further comprising relaying the P-Asserted Identity header set to the URI value "urn: services: sos".

10. A non-transitory computer readable medium having stored thereon computer executable components for a network to prompt a user equipment to priority handle an emergency call with a Public Safety Access Point (PSAP), the computer executable components comprising:

a set of codes for causing a computer to establish a communication session with the user equipment;

a set of codes for causing the computer to transmit a data packet communication originating from the PSAP to the user equipment, wherein the transmitted data packet communication includes a header that identifies the communication session as an emergency call and prompts the user equipment to interrupt a current communication session and thereby priority handle the emergency call: and a set of codes for setting an "emergency-callback" value in the header to identify the communication session as the emergency call.

11. An apparatus for a network to prompt a user equipment to priority handle an emergency call with a Public Safety Access Point (PSAP), comprising:

means for establishing a communication session with the user equipment;

means for transmitting a data packet communication originating from the PSAP to the user equipment, wherein the transmitted data packet communication includes a header that identifies the communication session as an emergency call and prompts the user equipment to interrupt a current communication session and thereby priority handle the emergency call: and means for setting an "emergency-callback" value in the header to identify the communication session as the emergency call.

12. An apparatus for a network to prompt a user equipment to priority handle an emergency call with a Public Safety Access Point (PSAP), comprising:

an uplink and a downlink configured to establish a communication session with the user equipment;

a computing platform configured to transmit a data packet communication originating from the PSAP to the user equipment on the downlink, wherein the transmitted data packet communication includes a header that identifies the established communication session as an emergency call and prompts the user equipment to interrupt a current communication session and thereby priority handle the emergency call, wherein the computing platform is further configured to set an "emergency-callback" value in the header to identify the communication session as the emergency call.

13. The apparatus of claim 12, further comprising a radio access node configured to wirelessly relay the header to the user equipment.

14. The apparatus of claim 12, wherein:

the uplink is further configured to receive a call initiated by the user equipment to the PSAP;

the computing platform is further configured to detect that the user equipment identified the call as an emergency call; and the downlink is further configured to transmit the data packet communication having the header that identifies the communication session as the emergency call to facilitate a callback from the PSAP to the user equipment in response to the emergency call initiated by the user equipment releasing.

15. The apparatus of claim 12, wherein:

the uplink is further configured to receive a call request initiated by the user equipment to the PSAP that is not self-identified as an emergency session establishment request; and the downlink is further configured to transmit the data packet communication having the header that identifies the communication session as an emergency call to indicate that a network detected that the user equipment initiated the call request to establish the emergency call.

16. The apparatus of claim 12, wherein the computing platform is further configured to transmit the data packet communication from an Internet Protocol Multimedia Subsystem (IMS) coupled to the PSAP, wherein the header is set by a media gateway control function (MGCF).

17. The apparatus of claim 12, wherein the downlink is further configured to relay a P-asserted Identity header set by the PSAP originating a Session Initiation Protocol (SIP) message.

18. The apparatus of claim 12, wherein the downlink is further configured to relay a P-asserted Identity header set by a media gateway control function (MGCF) originating a Session Initiation Protocol (SIP) message.

19. The apparatus of claim 12, wherein the downlink is further configured to relay the P-Asserted Identity header set to a Uniform Resource Identifier (URI) indicating that the emergency call originates from the PSAP.

20. The apparatus of claim 19, wherein the downlink is further configured to relay the P-Asserted Identity header set to the URI value "urn:services:sos".

* * * * *